(12) United States Patent
Harrison

(10) Patent No.: US 6,827,091 B2
(45) Date of Patent: Dec. 7, 2004

(54) PASSIVE BACK-FLUSHING THERMAL ENERGY SYSTEM

(75) Inventor: Stephen J. Harrison, Kingston (CA)

(73) Assignee: Queen's University at Kingston, Kingston (CA)

(*) Notice: Subject to any disclaimer, the term of this patent is extended or adjusted under 35 U.S.C. 154(b) by 34 days.

(21) Appl. No.: 10/216,374

(22) Filed: Aug. 12, 2002

(65) Prior Publication Data

US 2003/0034149 A1 Feb. 20, 2003

Related U.S. Application Data

(60) Provisional application No. 60/311,095, filed on Aug. 10, 2001.

(51) Int. Cl.⁷ ............................. F24D 19/00; F28F 27/02
(52) U.S. Cl. .................... 134/22.18; 134/105; 137/468; 137/340; 137/513.7; 62/303; 165/95; 165/97; 165/DIG. 100; 165/DIG. 354
(58) Field of Search ......................... 210/175; 137/468, 137/340, 564, 513.7; 165/95, 97, 303, 287, 281, 48.2, DIG. 100, DIG. 354; 62/303; 134/22.18, 90, 105–108

(56) References Cited

U.S. PATENT DOCUMENTS 4,102,393 A * 7/1978 Withers, Jr. .................. 165/95

FOREIGN PATENT DOCUMENTS

| DE | 19948703 | 10/1999 |
| DE | 20009140 | 5/2000 |
| EP | 0292814 A1 | 5/1988 |
| EP | 0635682 A1 | 7/1994 |

OTHER PUBLICATIONS

Baker, D., et al., "Designing solar hot water systems for scaling environments." *Journal of Solar Energy Engineering.* 123:43–47 (2001).

Freeman, G.A., et al., "An indirect solar–assisted heat pump hot water heater for the Canadian environment: A feasibility study." Presented at the 23rd Annual Conference of the Solar Energy Society of Canada, Vancouver, B.C. (Jun. 1997).

Elliott, C.A., et al., "Development of solar domestic hot water systems to reduce electric utility peak loads," SESCI Conference, Quebec City, Quebec (1993).

Purdy, J.M., et al., "The fouling of heat exchangers in natural convection applications," Solar Energy Society of Canada, Conference, Montreal, Quebec (1998).

* cited by examiner

*Primary Examiner*—Terry K. Cecil
(74) *Attorney, Agent, or Firm*—Stephen J. Scribner; Carol Miernicki Steeg

(57) ABSTRACT

A thermal energy system including a heat exchanger for transferring thermal energy between a source and a load, the heat exchanger having a primary side associated with the source, and a secondary side for conducting a fluid associated with the load, wherein the secondary side of the heat exchanger is passively back-flushed upon consumption of a portion of the fluid. Passive back-flushing prevents fouling of the heat exchanger due to sediments, scale, and mineral deposits which may be present in the circulating fluid.

35 Claims, 6 Drawing Sheets

PASSIVE BACK-FLUSHING THERMAL ENERGY SYSTEM

RELATED APPLICATION

This application claims the benefit of the filing date of U.S. patent Application No. 60/311,095, filed Aug. 10, 2001, the contents of which are incorporated herein by reference in their entirety.

FIELD OF THE INVENTION

This invention relates to thermal energy systems employing heat exchangers. In particular, the invention relates to a thermal energy system with passive back-flushing of a heat exchanger, and methods for passively back flushing systems.

BACKGROUND OF THE INVENTION

Thermal energy systems incorporating heat exchangers typically comprise a primary loop, from which heat is supplied or removed, and a secondary loop, to or from which heat is transferred. The heat exchanger transfers heat between the primary and the secondary loop. A heat transfer fluid is circulated through the primary loop, supplying heat to, or removing heat from, the primary side of the heat exchanger. A secondary fluid to which heat is supplied or from which heat is removed flows through the secondary side of the heat exchanger. The primary and secondary sides of the heat exchanger typically have numerous small passageways in close association through which the fluids flow, which facilitate the transfer of thermal energy therebetween.

Modern heat exchangers are compact and offer high performance, i.e., high rates of heat transfer. High performance is usually achieved by making the passageways very small, and providing many of them. However, as the size of the passageways is reduced, they become more prone to fouling or complete blockage due to the accumulation of sediments, scale, and mineral deposits that may be present in the circulating fluid. Fouling of the heat exchanger leads to a substantial drop in performance of the system. Specific measures taken to minimize fouling include monitoring and control of the chemical composition of the fluids, frequent disassembly for cleaning of the flow passages, and oversizing of heat transfer surfaces and flow passages to ensure that they will have sufficient capacity even when operating at decreased effectiveness due to fouling. In the case of thermal systems for heating potable or process water, there is a high probability that mineral salts and other impurities may be present in the water. In such cases a potential for fouling of the heat exchanger exists if the exchanger is not routinely cleaned or flushed of accumulated matter. In many applications, such as residential and small commercial installations, monitoring of the chemical composition of the water, routine disassembly and cleaning of the heat exchanger, or oversizing are not practical due to the associated costs.

SUMMARY OF THE INVENTION

According to one aspect of the invention there is provided a thermal energy system, comprising: a heat exchanger for transferring thermal energy between a source and a load, the heat exchanger having a primary side associated with said source, and a secondary side for conducting a fluid associated with said load; wherein the secondary side of the heat exchanger is passively back-flushed upon consumption of a portion of said fluid. In certain embodiments, the thermal energy system further comprises a storage tank associated with the load.

In one embodiment, the load is a hot water supply and the fluid is water. In another embodiment, the load is a chilled water supply and the fluid is water.

In another embodiment, a thermal energy system of the invention further comprises a back-flushing valve, wherein the back-flushing valve passively controls back-flushing of the secondary side of the heat exchanger. In certain embodiments, the back-flushing valve is activated by at least one of flow rate, temperature, and pressure of the fluid. In a preferred embodiment, the back-flushing valve is activated by flow rate of the fluid. In further embodiments, the back-flushing valve provides a bypass flow when the valve is closed. In some embodiments the bypass flow is about 1% to about 20% of a flow rate during consumption of the fluid.

In certain embodiments, the source is a heat source selected from solar heat, waste heat, geothermal heat, industrial process heat, a heat pump, a boiler, and a furnace. In a preferred embodiment, the heat source is solar heat.

In a further embodiment of the invention there is provided a thermal energy system comprising: a heat exchanger for transferring thermal energy between a source and a load, the heat exchanger having a primary side associated with said source, and a secondary side for receiving fluid to be heated or cooled and outputting said heated or cooled fluid, the fluid flowing through the secondary side of the heat exchanger in a first direction; an input for receiving mains fluid; and a back-flushing valve for controlling flow of the heated or cooled fluid and the mains fluid; wherein, upon consumption of a portion of the heated or cooled fluid, the back-flushing valve passively directs mains fluid through the secondary side of the heat exchanger in a second direction opposite to that travelled by the heated or cooled fluid. In one embodiment, the back-flushing valve provides a bypass flow when the valve is closed. In some embodiments the bypass flow is about 1% to about 20% of a flow rate during consumption of the fluid.

According to a further aspect of the invention there is provided a module for a thermal energy system including a storage tank associated with a load, said module comprising: a heat exchanger for transferring heat from a heat source to a load, the heat exchanger having a primary side for receiving heat from a heat source and a secondary side for receiving water to be heated and outputting said heated water to the load, the heated water flowing through the secondary side of the heat exchanger in a first direction; an input for receiving mains water; and a back-flushing valve for controlling flow of the water to be heated and the mains water; wherein, upon consumption of a portion of the water to be heated, the back-flushing valve passively directs mains water through the secondary side of the heat exchanger in a second direction opposite to that travelled by the water to be heated. In one embodiment, the back-flushing valve provides a bypass flow when the valve is closed. In some embodiments the bypass flow is about 1% to about 20% of a flow rate during consumption of the fluid.

By another aspect of the invention there is provided a method for passively back flushing a heat exchanger in a thermal energy system, comprising: providing a heat exchanger for transferring thermal energy between a source and a load, the heat exchanger having a primary side associated with said source, and a secondary side for conducting a fluid associated with said load; providing a source of excess fluid; flowing the fluid through the secondary side of the heat exchanger in a first direction; and upon consumption of at least a portion of the fluid by the load, passively flowing said excess fluid through the secondary side of the heat exchanger in a second direction opposite to the first direction.

In one embodiment of the method, the thermal energy system is a hot water system. In certain embodiments, the heat source is selected from solar heat, waste heat, geothermal heat, industrial process heat, a heat pump, a boiler, and a furnace. In a preferred embodiment, the heat source is solar heat. In yet another embodiment of the method, the thermal energy system is a chilled water system.

In one embodiment, the back-flushing step is activated by at least one of flow rate, temperature, and pressure of the fluid. In a preferred embodiment, the back-flushing step is activated by flow rate of the fluid.

BRIEF DESCRIPTION OF THE DRAWINGS

Embodiments of the invention are described below, by way of example, with reference to the accompanying drawings, wherein.

DETAILED DESCRIPTION OF THE INVENTION

In accordance with the invention, a heat exchanger has a primary side, to which heat is supplied, or from which heat is removed, and a secondary side, from which heat is obtained, or to which heat is lost. A heat or cooling source can be either in direct contact with the primary side of the heat exchanger, or located away from the heat exchanger. Examples of a heat source are solar heat, waste heat (e.g., exhaust), geothermal heat, industrial process heat, a heat pump, a boiler, and a furnace. Examples of a cooling source are a chiller (e.g., refrigeration device) and a geothermal source. Where the source is located away from the heat exchanger, the source can be coupled to the heat exchanger via a heat transfer fluid. The heat transfer fluid flows through a plurality of channels in the primary side of the heat exchanger, those channels being closely associated with a plurality of channels in the secondary side of the heat exchanger. The heat transfer fluid can be, for example, water (which may be purified, e.g., distilled, or waste water, e.g., water from an industrial process), an antifreeze solution (e.g., propylene glycol), steam, refrigerant, exhaust gas, oil, and the like. In some embodiments, the primary side of the heat exchanger comprises an open loop, wherein the heat transfer fluid (e.g., exhaust gas) is simply released after passing through the primary side of the heat exchanger. In other embodiments, the primary side of the heat exchanger comprises a closed loop, wherein the heat transfer fluid is retained in the system and circulated between the heat/cooling source and the primary side of the heat exchanger. In systems with an open primary loop, fouling of the primary side of the heat exchanger due to impurities in the heat transfer fluid can be mitigated by, for example, over-sizing the heat exchanger. In systems with a closed primary loop, fouling of the primary side of the heat exchanger can be mitigated by controlling the chemical composition of the heat transfer fluid to remove any impurities.

The secondary side of the heat exchanger is also prone to fouling, and can be the most important factor that degrades system performance. Fouling of the secondary side of the heat exchanger is most common in applications where the fluid in the secondary loop is consumed, and must be replenished. Examples of such systems are potable hot or chilled water supplies, and industrial processes requiring a heated or chilled fluid such as water, where the water is consumed in the process. In both of these examples, water enters the system from a source, and carries with it impurities (e.g., sediment, minerals, salts, and other solutes) that lead to fouling of the heat exchanger. Although water entering the system can be pre-treated (e.g., filtered) to remove impurities, such pre-treatment is not practical in residential and small commercial applications. Thus, thermal energy systems for storing heat as hot water, and/or for supplying potable hot water, such as, for example, solar water heating systems, heat pump systems, and district heating systems, in both residential and commercial installations, are susceptible to heat exchanger fouling.

According to one aspect of the invention there is provided a thermal energy system comprising a heat exchanger, wherein the secondary side of the heat exchanger is passively back-flushed. In preferred embodiments, the secondary side of the heat exchanger is passively back-flushed in response to a change in one or more variables (e.g., temperature, pressure, flow rate) of the fluid in the secondary side of the heat exchanger. The invention is particularly suited to applications where the fluid to which heat is supplied or from which heat is removed is consumed, such as, for example, water heating or cooling systems. In such systems, the secondary side of the heat exchanger is passively back-flushed each time the system is replenished with fluid. According to the invention, passive back-flushing of the heat exchanger is a normal operation of the system, and does not require user-intervention or external controls to operate. Back-flushing can routinely be performed many times within a short period (e.g., one day). During back-flushing, scale, mineral deposits, and sediment are flushed out of the heat exchanger, thus preventing fouling of the heat exchanger.

As used herein, the term "thermal energy" is a term of art and is understood to encompass both hot and cold.

It will be appreciated that the invention is not limited to heating or cooling water. Thus, while the invention is described herein primarily with respect to use with water, it can be used with other fluids.

It will also be appreciated that, although the invention is described herein primarily with respect to thermal energy systems, the invention is not limited thereto. The invention is suitable for use other applications, such as a system employing a fluid medium which is consumed and occasionally replenished, where passive back-flushing of at least a portion of the system (e.g., a filter) with the replenishing fluid is beneficial.

Figure 1:
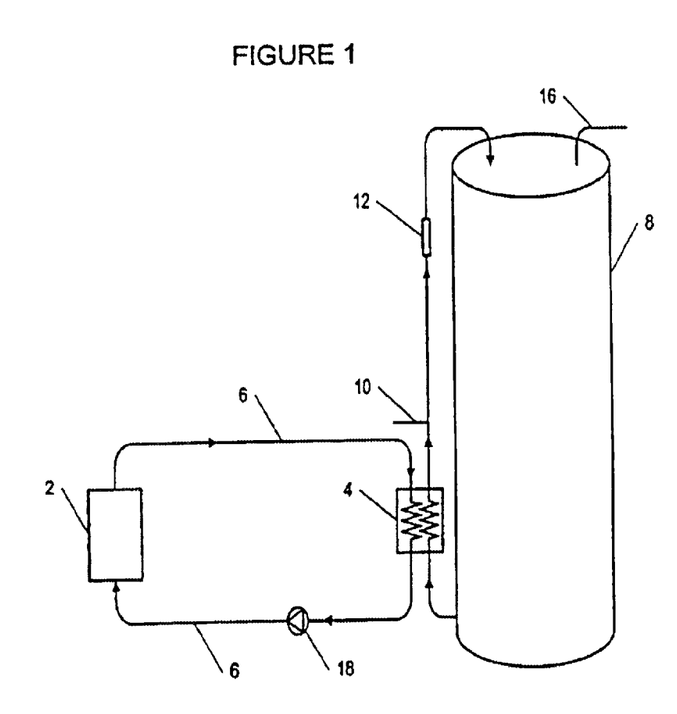
FIG. 1 is a block diagram of a generalized thermal energy heating system in accordance with the invention, shown in charging mode.

In one embodiment, a thermal energy system according to the invention is a water heating system, for example, for supplying domestic potable hot water. As shown in the embodiment of FIG. 1, the primary loop is a closed loop comprising a heat source 2 and suitable tubing or pipes 6 for circulating a heat transfer fluid between the heat source 2 and the primary side of a heat exchanger 4. A pump 18 can optionally be inserted into the primary loop to facilitate circulation of the heat transfer fluid. In some embodiments, such as those employing a water-based heat transfer fluid (e.g., a water-propylene glycol solution), the primary loop additionally comprises an expansion tank (not shown), to compensate for expansion/contraction of the heat transfer fluid as it changes temperature. The secondary loop of the system comprises the secondary side of the heat exchanger 4, a water storage tank 8, a "T" joint 10, and a back-flushing control valve 12. Hot water is drawn from the top of the water storage tank 8 via a pipe or tube 16. Mains water enters the secondary loop via the "T" joint 10, to replenish water drawn from the secondary loop via a pipe 16.

As used herein, the term "mains water" refers to water entering the system from a water source, such as a city water distribution network or a well. Mains water enters the secondary loop of the system to be heated or chilled.

The embodiment of FIG. 1 is shown in charging mode; that is, water is not being drawn from the system via pipe 16, and water is not entering the secondary loop via the "T" joint 10. In charging mode the direction of flow of fluid (in this example, water) is indicated by arrows in FIG. 1. Operation of this embodiment is as follows. When water is not being drawn from the storage tank 8, the back-flushing control valve 12 is open. Water circulates through the secondary side of the heat exchanger 4 and the storage tank 8 such that heated water flows upward through the valve 12 and into the top of the tank, and out of the bottom of the tank into the heat exchanger. This flow can be established by a pump, or by convection, and stratifies the storage tank 8, such that the hottest water is at the top of the tank. Preferably the flow is established by convection, which simplifies the system design and facilitates back-flushing of the secondary side of the heat exchanger (described below). Also, it is preferred that this flow rate is slow (e.g., up to about 2.5 L/min), to avoid mixing of water in the storage tank 8.

Figure 2:
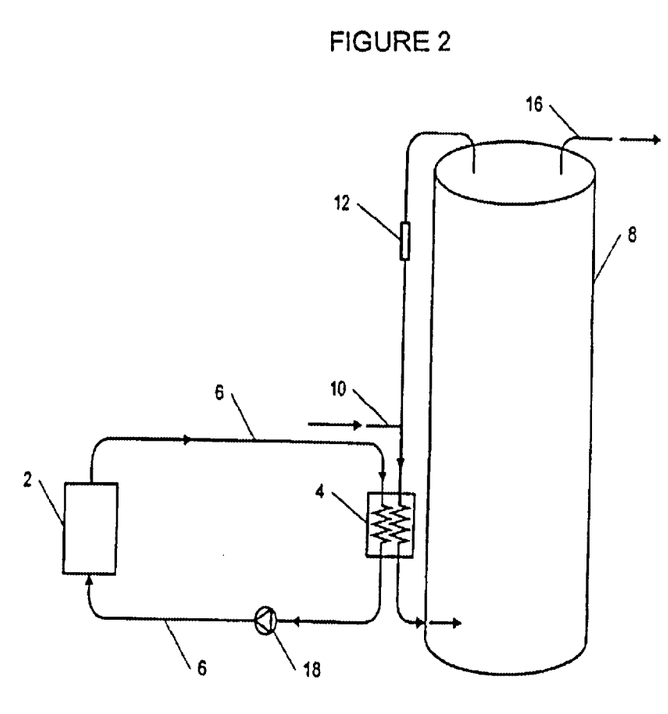
FIG. 2 is a block diagram of a generalized thermal energy heating system in accordance with the invention, shown in back-flushing mode.

When water is drawn from the storage tank 8, the back-flushing control valve 12 passively closes. As shown in FIG. 2, closing of the valve 12 causes mains water to be routed through the secondary side of the heat exchanger 4 and enters the storage tank 8 at the bottom. Moreover, the flow of mains water through the secondary side of the heat exchanger 4 is in the opposite direction to the flow of water during heating (when mains water is not being drawn into the system). This opposite direction of flow provides passive back-flushing of the secondary side of the heat exchanger 4. Thus, each time water is drawn from the storage tank 8, the secondary side of the heat exchanger 4 is passively back-flushed.

Many of the fouling components in water are solutes (e.g., inverse soluble salts such as $CaCO_3$, $Mg(OH)_2$, $CaSiO_3$, and $CaSO_4$) that precipitate at high temperatures (Purdy et al., Conference Proceedings, Solar Energy Society of Canada Inc., Montreal, 1998). By back-flushing the heat exchanger 4 with unheated mains water, solutes precipitated in the secondary side of the heat exchanger 4 are put back into solution. The solutes are deposited in the storage tank 8, where they are precipitated, with little impact on the system, and/or eventually discharged from the tank as hot water is drawn therefrom.

Figure 3:
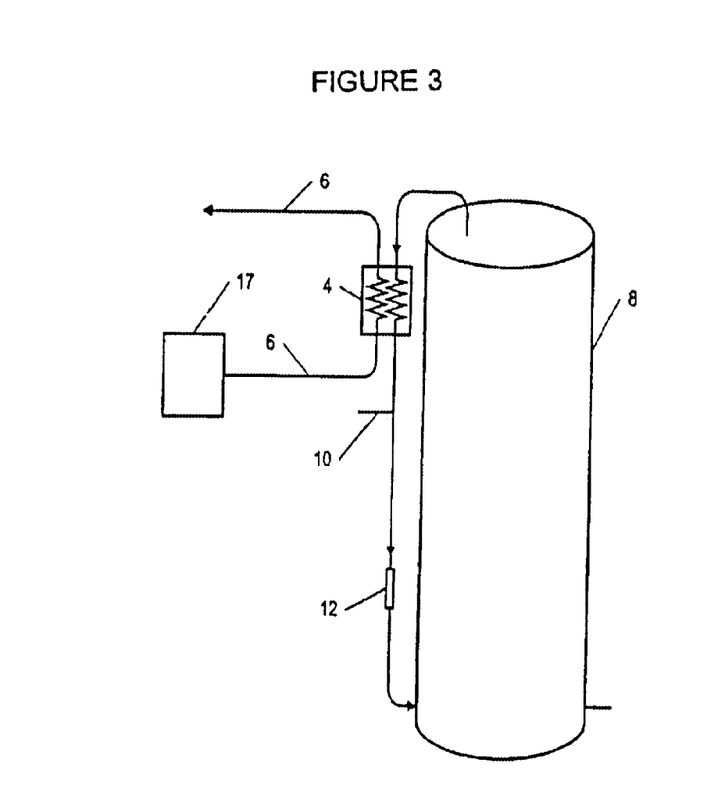
FIG. 3 is a block diagram of a generalized thermal energy cooling system in accordance with the invention, shown in charging mode.

In another embodiment, a thermal energy system according to the invention is a water cooling system, for example, for supplying domestic potable chilled water. As shown in FIG. 3, the primary loop, which can be an open loop or a closed loop, comprises a cooling source or chiller 17 and suitable tubing or pipes 6 for circulating a heat transfer fluid between the chiller 17 and the primary side of a heat exchanger 4. A pump 18 can optionally be inserted into the primary loop to facilitate circulation of the heat transfer fluid. In some embodiments, such as those employing a water-based heat transfer fluid (e.g., a water-propylene glycol solution), the primary loop additionally comprises an expansion tank (not shown), to compensate for expansion/contraction of the heat transfer fluid as it changes temperature. The secondary loop of the system comprises the secondary side of the heat exchanger 4, a water storage tank 8, a "T" joint 10, and a back-flushing control valve 12. Cold water is drawn from the bottom of the storage tank 8 via a pipe or tube. Mains water enters the secondary loop via the "T" joint 10, to replenish water drawn from the secondary loop.

The embodiment of FIG. 3 is shown in charging mode; that is, water is not being drawn from the system via pipe 18, and water is not entering the secondary loop via "T" joint 10. In charging mode the direction of flow of fluid (in this example, water) is indicated by arrows in FIG. 3. Operation of this embodiment is as follows. When water is not being drawn from the storage tank 8, the back-flushing control valve 12 is open. Water circulates through the secondary side of the heat exchanger 4 and the storage tank 8 such that chilled water flows downward through the valve 12 and into the bottom of the tank, and out of the top of the tank into the heat exchanger. This flow can be established by a pump, or by convection, and stratifies the storage tank 8, such that the coldest water is at the bottom of the tank. Preferably the flow is established by convection, which simplifies the system design and facilitates back-flushing of the secondary side of the heat exchanger (described below). Also, it is preferred that this flow rate is slow (e.g., up to about 2.5 L/min), to avoid mixing of water in the storage tank 8.

Figure 4:
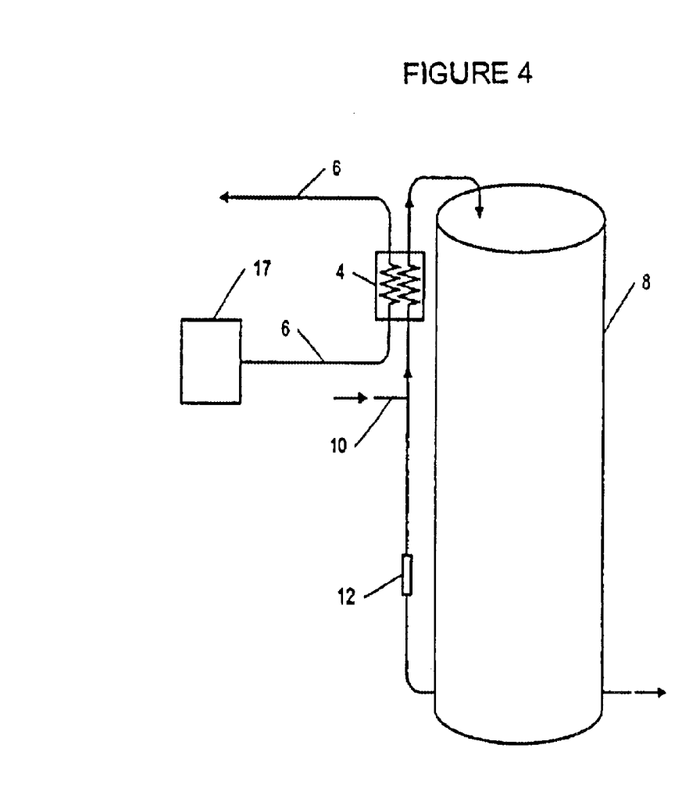
FIG. 4 is a block diagram of a generalized thermal energy cooling system in accordance with the invention, shown in back-flushing mode.

When water is drawn from the storage tank 8, the back-flushing control valve 12 passively closes. As shown in FIG. 4, closing of the valve 12 causes mains water to be routed through the secondary side of the heat exchanger 4 and enters the storage tank 8 at the top. Moreover, the flow of mains water through the secondary side of the heat exchanger 4 is in the opposite direction to the flow of water during chilling (when mains water is not being drawn into the system). This opposite direction of flow provides passive back-flushing of the secondary side of the heat exchanger 4. Thus, each time water is drawn from the storage tank 8, the secondary side of the heat exchanger 4 is passively back-flushed.

In a preferred embodiment, a thermal energy system according to the invention is a solar hot water system. The hot water system is much like the generalized system shown in FIG. 1, and further comprises one or more solar collectors as a heat source 2. Heat transfer fluid is heated in the solar collector(s) and the heat is transferred to water in the heat exchanger 4.

In a more preferred embodiment, the storage tank 8 is any standard, commercially available domestic hot water tank (e.g., 180 to 450 liters), and various components of the system (e.g., the heat exchanger, the back-flushing control valve) are adapted to attach to such hot water tank. In a further embodiment, shown by example in Appendix 1, the invention provides a module adapted for ease of installation on an existing hot water tank, the module comprising a heat exchanger, a back-flushing control valve, and optionally further components such as one or more circulating pumps, one or more expansion tanks for the heat transfer fluid, and an electronic interface. The optional electronic interface can provide information regarding system performance, for example. When used with a standard hot water tank, a system according to the invention supplements the hot water tank, and thus reduces the energy cost of heating water.

To maximize effectiveness of the heat exchanger and to improve overall system efficiency, flow rates in the primary and secondary sides of the heat exchanger should be of similar magnitude. The heating or cooling source is an influencing factor in determining flow rate in the primary and secondary loops. However, to maximize overall efficiency of a system employing a storage tank for domestic hot water, such as that described in the above embodiment, stratification of the tank, with, e.g., hottest water at the top, a slow flow rate is necessary.

For example (see also Appendix 1), in a preferred embodiment of the invention, there is provided a solar hot water system optimized for a typical residential application, e.g., a North American household (up to five individuals) with hot water consumption of about 200 to 300 L/day, and a 270 L hot water tank. With an average of 8 hours (480 minutes) of heating per day, and about 3 to 6 m² of solar collector area, it would take a flow rate of about 0.6 L/min to charge the hot water tank. In such installations, a heat exchanger with a total heat exchange area of about 0.25 m² to about 1 m² would be appropriate. For example, a stainless-steel, brazed plate heat exchanger, model no. E8-20, available from SWEP International of Sweden, is suitable.

The preferred embodiment of the invention thus utilizes fluid flow rates through the heat exchanger which are slower than those used in conventional high-flow designs. According to the invention the flow rate of heat transfer fluid is in the range of about 0.5 to about 2.5 L/min, preferably about 0.5 L/min to about 1.5 L/min. The flow rate of fluid through the secondary side of the heat exchanger is from 0 L/min to about 2.5 L/min. The maximum flow rate through the secondary side of the heat exchanger occurs when the water in the storage tank is cold (i.e., uncharged), and the flow rate gradually slows as the water in the tank heats up. The convective flow essentially stops when the tank is fully charged, i.e, when the temperature in the storage tank is approximately the same as that of the primary loop. For example, in certain embodiments, convective flow stops when the water in the tank reaches about 60° C. In this regard the system is self limiting with respect to the maximum temperature reached by water in the tank.

It will be appreciated that a thermal energy system according to the invention can be scaled appropriately for larger or smaller installations, and for applications other than solar hot water heating.

In the generalized embodiment shown in FIG. 1, and in the solar hot water system described above, the back-flushing control valve is normally open during heating of the fluid in the storage tank, and closed when fluid is drawn therefrom, so that the secondary side of the heat exchanger is back-flushed. The back-flushing control valve can be any valve that is activated (e.g., opens, closes) by a change in one or more system variables (e.g., temperature, pressure, flow rate). It is preferable that the back-flushing control valve is passive, meaning that activation of the valve does not require user intervention and is automatic. It is also preferable that activation of the valve is not scheduled. In one embodiment, the back-flushing control valve is thermally activated (i.e., activated by a change in fluid temperature). For example, where the system is for heating potable water, the valve is open when the water is warm (e.g., about 15° C. or warmer, preferably about 25° C. or warmer), and closed for lower water temperatures. Of course, these valve opening and closing temperatures depend on the temperature of the mains water. In this example, drawing hot water from the storage tank causes unheated mains water to flow into the system, and when the mains water reaches the thermally-activated valve, the valve closes, forcing mains water to flow through and back-flush the secondary side of the heat exchanger.

Figure 5:
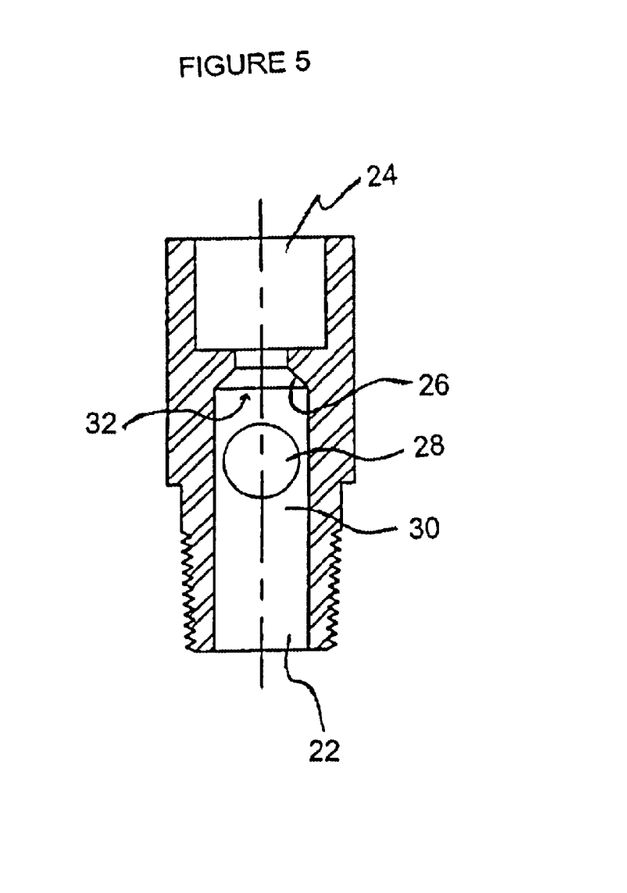
FIG. 5 is a schematic diagram of a back-flushing valve according to the invention.
Figure 7:
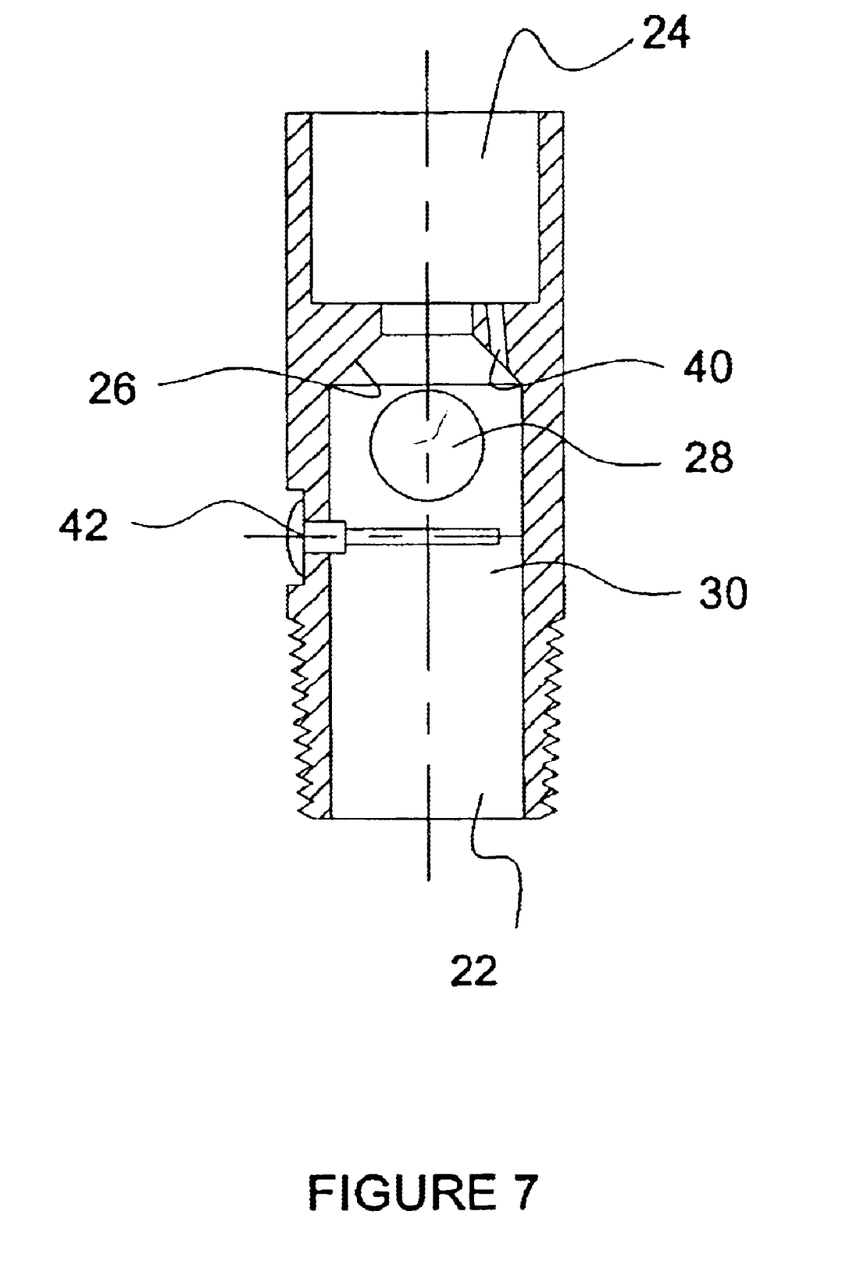
FIG. 7 is a schematic diagram of another embodiment of a back-flushing valve according to the invention.

In accordance with another aspect of the invention, there is provided a back-flushing control valve for a thermal energy system. In a preferred embodiment, the back-flushing control valve is a specialized ball valve activated by the flow rate of fluid therethrough. In general, the back-flushing control valve comprises a valve body having an input port, an output port, and valve seat, an orifice passing through the valve seat, and a ball for engaging the valve seat. In one embodiment, shown in FIG. 5, the valve is designed for vertical orientation, with the output port 24 and valve seat 26 facing upwards, and orifice 32 passing through the valve seat 26. The ball 28 is disposed in a cavity 30 between the input port 22 and seat 26. Preferably, the cavity has an inside diameter of approximately the same magnitude as that of the pipe to which it is connected, so as to avoid turbulence in the flow. Although not shown in FIG. 5, it will be appreciated that the ball 28 can be captured (retained) in the cavity 30 by providing a suitable boss or the like, or a retaining screw (see, for example. FIG. 7) within the cavity 30. It should be noted that although the ball 28 is depicted in FIG. 5 as generally spherical, other shapes, (e.g., oblong or egg-shaped) are contemplated by the invention. The valve body can be made from any suitable material such as plastics, brass, copper, bronze, etc. The input port 22 and output port 24 are adapted for connection, via screw threads, soldering, or the like, to standard pipes or connectors.

In a valve optimized for use with a solar hot water system as described above, the ball 28 can move freely within the cavity 30, but generally sinks at flow rates below about 2.5 L/min, so that when the flow rate through the valve is below about 2.5 L/min, the ball will not engage the valve seat 26. However, at flow rates above about 2.5 L/min, such as those achieved when mains water enters the system upon drawing water from the storage tank, the ball rises and engages the valve seat 26. Thus, in the thermal energy system of the invention, the valve permits convective flow through the heat exchanger up to about 2.5 L/min during heating. When hot water is drawn from the storage tank, mains water enters the system at a higher flow rate, and such higher flow rate closes the valve. When the valve is closed, mains water is routed through the secondary side of the heat exchanger, thereby back-flushing the heat exchanger. It will of course be appreciated that the flow rates discussed above are exemplary, and are based on a convective flow rate up to about 2.5 L/min in a domestic hot water system. The system/valve can be adapted for other flow rates as considered below.

Factors affecting the flow rate at which the valve closes include the diameter of the cavity of the valve, the diameter of the orifice in the valve seat, the diameter/size of the ball, the density of the ball, and the presence/absence of air bubbles adhered to the ball. It is preferred that the ball provide the same closure flow rate with and without air bubbles. For example, when the density of the ball is selected so that the valve closes at a flow rate of about 1.5 L/min (with air bubbles), the valve closes at the flow rates indicated in Table 1 with no air bubbles adhered to the ball.

TABLE 1

Effect of Ball Diameter and Air Bubbles on Valve Closure Flow Rate

| Ball Diameter (mm) | Closure Flow Rate (L/min) | | Difference in |
|---|---|---|---|
| (5 mm < cavity diameter) | With air bubbles | Without air bubbles | Closure Flow Rate (L/min) |
| 8 | 1.5 | 3.1 | 1.6 |
| 9 | 1.5 | 3.4 | 1.9 |
| 10 | 1.5 | 3.8 | 2.3 |
| 11 | 1.5 | 4.2 | 2.7 |

As the ball diameter (and, correspondingly, the diameter of the cavity) increases, the difference in flow rate required to close the valve with and without air bubbles adhered to the ball increases. Therefore, a small cavity diameter and ball diameter are required to obtain valve closure flow rates (with and without air bubbles) which are reasonably similar in magnitude.

Pressure drop in the valve, due to the difference in the diameters of the cavity and of the seat of the valve, as a function of flow rate, also affects system performance. Generally, as the diameter of the ball increases, or the diameter of the cavity or orifice through the seat decreases, the pressure drop across the valve increases. Also, increasing the diameter of the ball increases the surface area available for adherence of air bubbles, and more air bubbles lowers the effective density of the ball. Therefore, the valve design represents a tradeoff between an acceptable pressure drop and satisfactory valve performance (i.e., the flow rate at which the valve actuates).

Figure 6:
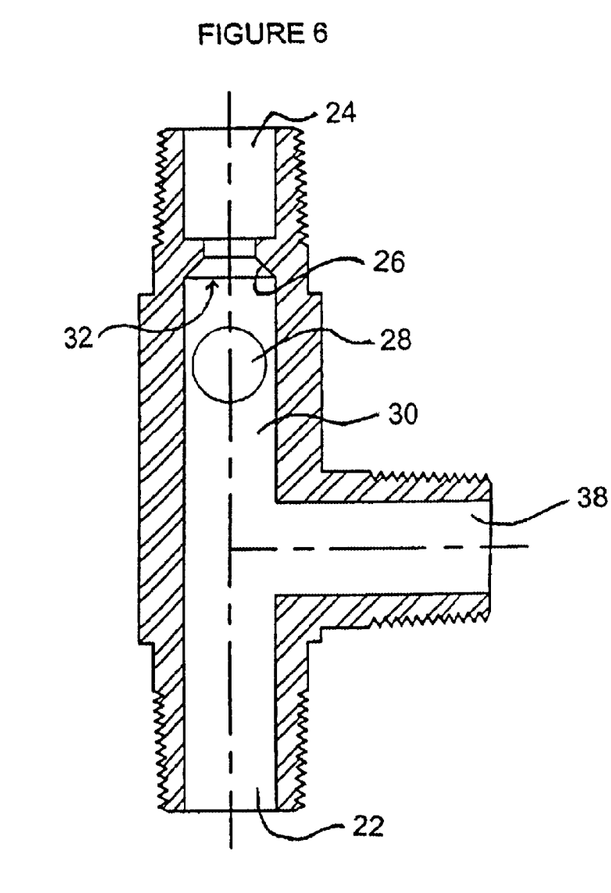
FIG. 6 is a schematic diagram of a back-flushing valve according to the invention.

Thus, to achieve optimum valve characteristics, a compromise between pressure drop and closure flow rate should be achieved. The embodiments shown in FIGS. 5 and 6 are examples of valves in which these variables have been optimized for a typical residential installation using standard ¾ inch water pipe. In these embodiments, the cavity diameter is about 16 mm (about 0.63 inches), the seat diameter is about 9 mm (about 0.35 inches), and the seat angle is about 45° with respect to the longitudinal axis of the valve, the ball material is Delrin™, with a density of about 1400 kg/m$^3$, and a diameter of about 11 mm (i.e., about 5 mm less than the diameter of the cavity). Of course, these dimensions can be adjusted to suit any application and desired closure flow rate. Other ball materials with a density of about 1200 kg/m$^3$ to about 1600 kg/m$^3$ are suitable, such as Teflon™, with a density of about 1550 kg/M$^3$. Note that the embodiment shown in FIG. 6 is configured as a "T" joint, the third port 38 for connection to a mains fluid supply. Neither of the embodiments of FIGS. 5 and 6 show a provision for capturing (retaining) the ball within the cavity. However, such embodiments are also provided by the invention, as discussed above.

In another embodiment, the back-flushing valve provides bypass flow; that is, flow through the valve when the ball is seated (i.e., when the valve is in the closed state), to reduce the pressure difference occurring across the valve in the closed state. The bypass flow reduces any mechanical shock caused by the valve closing and eliminates pressure waves that could result in "water hammer" in the associated system. This latter situation is most likely to occur in cases where the valve is located in close proximity to the mains water inlet. For example, in a typical solar domestic hot water system with a mains pressure of about 40 pounds per square inch (PSI), a bypass flow rate of about 1% to about 20%, preferably about 2% to about 10%, more preferably about 5% to about 8%, of the nominal hot water draw flow rate, is suitable. It will be appreciated that when the bypass flow rate is a small percentage of the hot water draw flow rate, the bypass flow will have only a minor effect on the temperature of hot water supplied from the storage tank. However, as the bypass flow rate increases, cooling of the hot water drawn from the storage tank will be more significant. Therefore, it is preferable to keep the bypass flow rate as low as possible.

The bypass flow can be provided, for example, by suitable ridges or grooves cast or machined into the valve, on or near the valve seat. In one embodiment, shown in FIG. 7, the bypass flow is provided by a small hole 40 (e.g., about 1 to 1.5 mm in diameter) bored through the seat of the valve 26, in a direction substantially parallel to the direction of fluid flow. It will be appreciated that such bypass hole allows a small amount of fluid flow through the valve when the ball 28 is seated. For example, at a mains pressure of about 40 pounds per square inch (PSI), the bypass hole provides a bypass flow rate of about 5% to about 10% of the nominal hot water draw flow rate. Such percentage of the flow will have only a minor effect of the temperature of hot water supplied from the storage tank; for example, less than 4° C. for a 1 mm bypass hole at 40 PSI. Also shown in FIG. 7 is a retaining screw 42 for retaining the ball 28 in the valve.

In another embodiment, the back-flushing control valve is inverted and installed at the top of the storage tank. In this configuration, the valve seat 26 and output port 24 are oriented downwards. Accordingly, the ball density is selected so that it generally floats at flow rates up to about 1.5 L/min to about 2.5 L/min, but is driven down to engage the valve seat at higher flow rates.

The invention is further described by way of the following non-limiting examples.

WORKING EXAMPLES

Example 1

Experimental Evaluation of a Passive Back-Flushing Heat Exchanger

To investigate the operation of the passive back-flushing valve, a test apparatus was constructed with two parallel natural convection loops, each loop with a heat exchanger, as described above, connected to a 450 L storage tank. The loops were identical except that a passive back-flushing control valve according to the invention was installed in one of the loops and the other loop was operated without the benefit of the valve. The primary side of each heat exchanger was supplied with hot water (60° C.) from the same source in such a way that the same flow rates and inlet temperatures were maintained in both loops. For the loop with the back-flushing valve, water was drawn from the bottom of the storage tank and used to back-flush the heat exchanger at one-hour intervals for 3 to 4 minutes. Flow circulation through the secondary side of both heat exchangers was driven by natural convection, caused by the density difference that existed between the heated water in the heat exchange loops and the cooler water in the storage tank. To accelerate the fouling test, the tank water was initially saturated with $CaCO_3$, $CaSiO_3$ and $Mg(OH)_2$. During the 5-month test period, 68.5 g of $CaCO_3$ was added at three intervals. This quantity ensured that the tank water was a saturated $CaCO_3$ solution.

After 5 months of continuous testing the system was stopped and both heat exchangers were examined. Observation of the heat exchanger with the passive back-flushing valve revealed that the flow passages of the secondary side of the heat exchanger were clear and free of any residue or blockage. In addition, the pressure drop across the heat exchanger and associated temperatures were consistent with those observed at the start of the test. When the heat exchanger from the loop without the passive back-flushing valve was removed, a large quantity of solid precipitate was found in the secondary side of the heat exchanger, such that the flow passages were effectively blocked. Consistent with this situation, the pressure drop across the secondary side of the heat exchanger was observed to be much greater than at the beginning of the test, and greater than that of the back-flushed heat exchanger. A review of the temperature data revealed that the rate of heat transfer cross the heat exchanger without the passive back-flushing valve was significantly reduced.

Therefore, the results indicate that under identical conditions of water constituents and temperature, the heat exchanger without back-flushing became significantly fouled with precipitated $CaCO_3$, while the heat exchanger fitted with the passive back-flushing valve of the invention had no significant amount of fouling and continued operate as initially installed.

Example 2

Operation of a Passive Back-Flushing System

Figure 8:
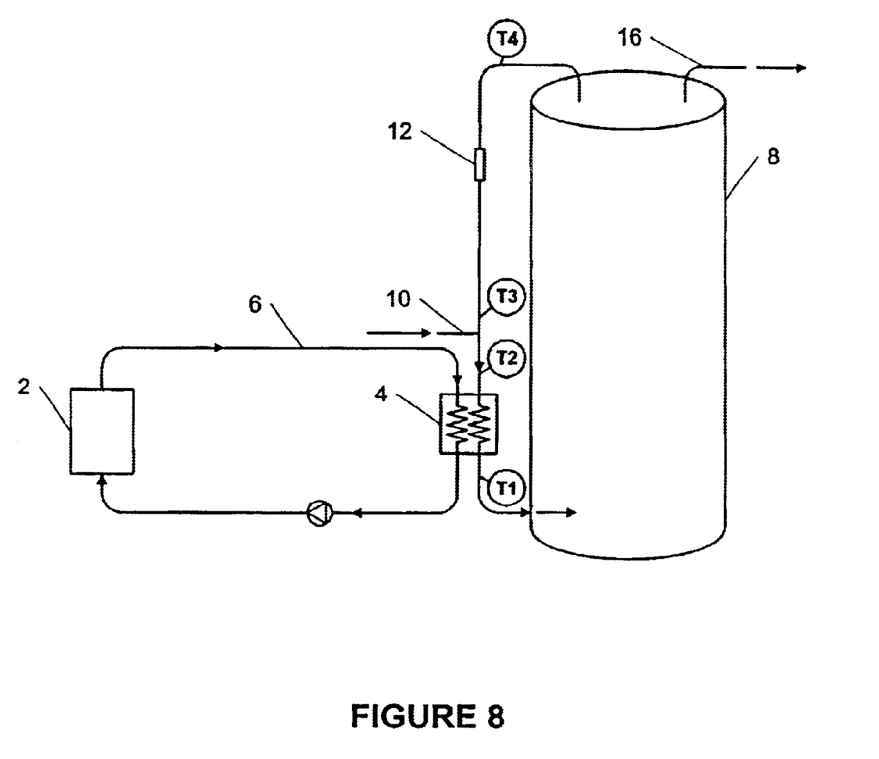
FIG. 8 is a schematic diagram of a thermal energy system according to the invention, with temperature sensors to measure fluid temperatures during operation. Arrows indicate flow direction during back-flushing.

To illustrate the operation of a passive back-flushing system according to the invention, a typical application (i.e., a solar domestic hot water system (SDHW)) was outfitted with temperature sensors to record fluid temperatures during a typical hot water draw. As shown in FIG. 8, the system consisted of a storage tank 8 for storing heated water, a natural convection flow loop connected from the bottom of the storage tank to the top of the storage tank through the secondary side of a heat exchanger 4, a mains water inlet "T" 10 and a passive back-flushing valve 12 similar to that shown in FIG. 5.

The fluid entering the primary side of the heat exchanger was heated to a nominal temperature of about 70° C. by solar collectors 2. During the test, temperatures were measured at specific locations on the secondary side of the heat exchanger loop (designated T1 to T4). Data shown in FIG. 9 was recorded over a period of time consisting of time intervals before, during and after the draw of hot water from the top of the storage tank via outlet 16. In FIG. 8, direction arrows are shown for the draw mode.

Prior to drawing hot water from the system, the temperature at T1 indicated that cool water from the bottom of the storage tank entered the secondary side of heat exchanger at 16° C. and was heated to 47° C. The nominal flow through this side of the heat exchanger was 1 L/min at this time and was caused by buoyancy forces resulting from the heating of the water (e.g., natural convection). At the start of the draw, hot water was removed from the top of the storage tank, which caused cold "mains" water to enter through the "T" 10 located above the heat exchanger in the secondary loop. The flow of water into the system at this point caused the back-flushing valve 12 to close and the flow direction to reverse, sending cold mains water through the heat exchanger in the opposite direction to that occurring during heating (prior to the draw). The flow of mains water through the system was about 3.5 times that of the natural convection flow which occurred in the heating mode. During the draw period the temperatures below the "T" and the back-flushing valve (T2 and T3) were reduced to the mains water temperature, due to the inflow of cold water. The temperature at the inlet from the storage tank to the heat exchanger (T1), which was cold prior to the draw, increased slightly during the draw (i.e., during back-flushing of the heat exchanger). This increase in temperature occurred as result of heating of the mains water as it flowed through the heat exchanger in the opposite direction to the heating mode. The temperature rise of the mains water is lower than that for the natural convection driven flow because of the greater flow rate of the mains water through the heat exchanger.

Figure 9:
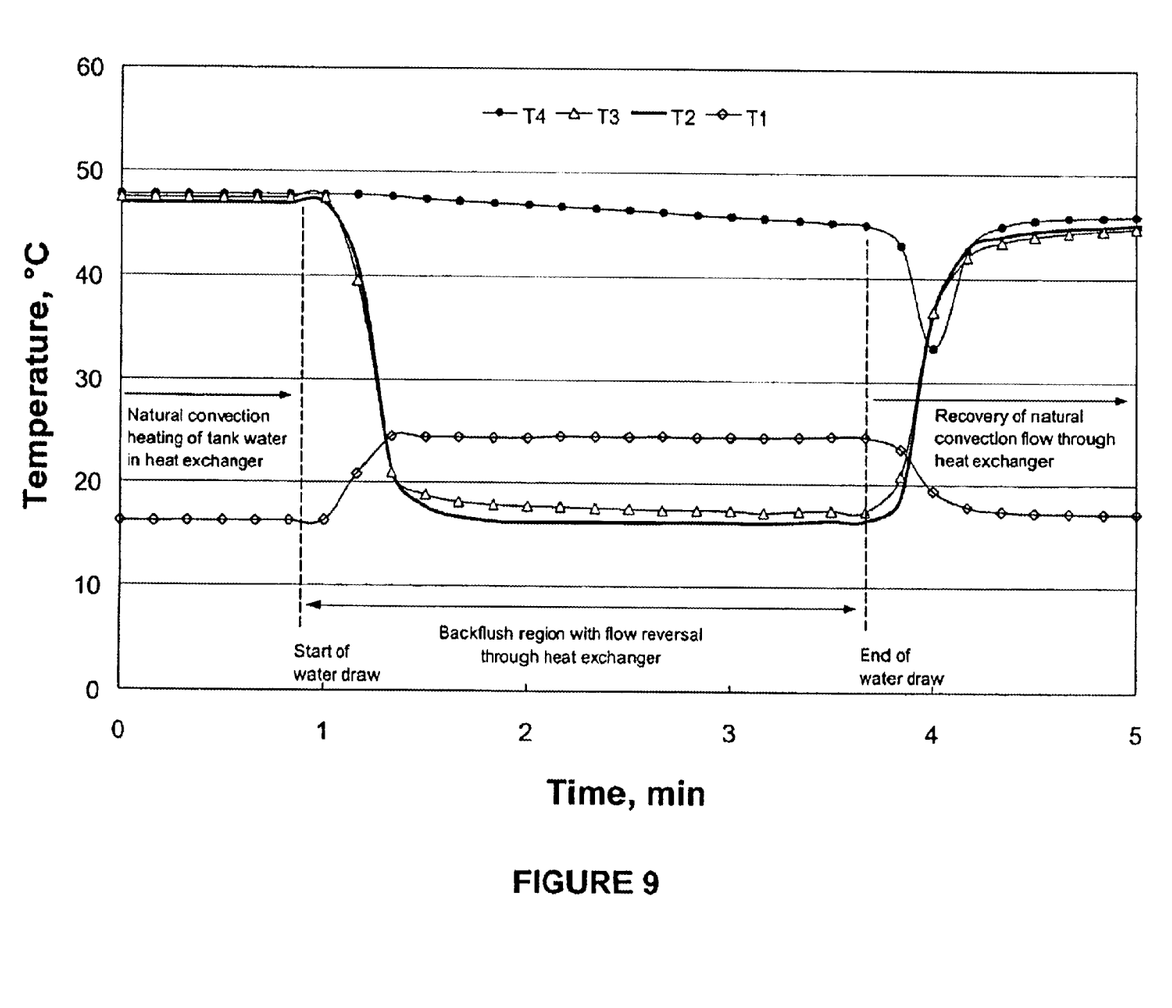
FIG. 9 is a plot showing water temperatures obtained with the system of FIG. 8, prior to, during, and after a 3-minute draw.

The data shown in FIG. 9 corresponds to a draw period of approximately 3 minutes. At the end of the draw period, removal of water from the system was stopped and the flow of mains water into the system ceased. At this point, the back-flushing valve re-opened and the natural convection flow of water from the storage tank resumed. The data indicate that about 90% of the convective flow was re-established within 30 seconds. This re-establishment of the natural convection flow resulted in a small depression of the temperature at the top of the secondary loop (T4) as the cooler water, below the back-flushing valve, was pushed up out of the convective flow loop and into the storage tank.

The contents of all cited documents and Appendix 1 are incorporated herein by reference in their entirety.

Those skilled in the art will recognize, or be able to ascertain using routine experimentation, variations of the embodiments and examples described herein. Such variations are intended to be within the scope of the invention and are covered by the appended claims.

I claim:

1. A thermal energy system, comprising:
   a heat exchanger for transferring thermal energy between a source and a load, the heat exchanger having a primary side associated with said source, and a secondary side for conducting a fluid associated with said load; and
   a means for passively backflushing the secondary side of the heat exchanger upon consumption of a portion of said fluid.

2. The thermal energy system of claim 1, further comprising a storage tank associated with said load.

3. The thermal energy system of claim 1, wherein the fluid is water.

4. The thermal energy system of claim 1, wherein the load is a hot water supply and the fluid is water.

5. The thermal energy system of claim 1, wherein the load is a chilled water supply and the fluid is water.

6. The thermal energy system of claim 4, wherein the secondary side of the heat exchanger is passively back-flushed with unheated water.

7. The thermal energy system of claim 5, wherein the secondary side of the heat exchanger is passively back-flushed with unchilled water.

8. The thermal energy system of claim 1, wherein the means for passively backflushing comprises a back-flushing valve, wherein the back-flushing valve passively controls back-flushing of the secondary side of the heat exchanger.

9. The thermal energy system of claim 8, wherein the back-flushing valve is activated by at least one of flow rate, temperature, and pressure of the fluid.

10. The thermal energy system of claim 8, wherein the back-flushing valve is activated by flow rate of the fluid.

11. The thermal energy system of claim 8, wherein the back-flushing valve provides a bypass flow when said valve is closed.

12. The thermal energy system of claim 11, wherein the bypass flow is about 1% to about 20% of a flow rate during consumption of the fluid.

13. The thermal energy system of claim 1, wherein the source is a heat source selected from solar heat, waste heat, geothermal heat, industrial process heat, a heat pump, a boiler, and a furnace.

14. The thermal energy system of claim 1, wherein the heat source is solar heat.

15. A thermal energy system comprising:
- a heat exchanger for transferring thermal energy between a source and a load, the heat exchanger having a primary side associated with said source, and a secondary side for receiving fluid to be heated or cooled and outputting said heated or cooled fluid, the fluid flowing through the secondary side of the heat exchanger in a first direction;
- an input for receiving mains fluid; and
- a back-flushing valve for controlling flow of the heated or cooled fluid and the mains fluid;
- wherein, upon consumption of a portion of the heated or cooled fluid, the back-flushing valve passively directs mains fluid through the secondary side of the heat exchanger in a second direction opposite to that travelled by the heated or cooled fluid.

16. The system of claim 15, wherein the fluid is water.

17. The system of claim 15, wherein the flow of fluid through the secondary side of the heat exchanger in a first direction is by convection.

18. The system of claim 15, wherein the back-flushing valve is activated by at least one of flow rate, temperature, and pressure of fluid.

19. The system of claim 15, wherein the back-flushing valve is activated by flow rate of fluid.

20. The system of claim 15, wherein the back-flushing valve is activated by temperature of fluid.

21. The system of claim 15, wherein the heat source is selected from solar heat, waste heat, geothermal heat, industrial process heat, a heat pump, a boiler, and a furnace.

22. The system of claim 15, wherein the heat source is solar heat.

23. The system of claim 15, wherein the back-flushing valve provides a bypass flow when said valve is closed.

24. The thermal energy system of claim 23, wherein the bypass flow is about 1% to about 20% of a flow rate during consumption of the fluid.

25. A module for a thermal energy system including a storage tank associated with a load, said module comprising:
- a heat exchanger for transferring heat from a heat source to a load, the heat exchanger having a primary side for receiving heat from a heat source and a secondary side for receiving water to be heated and outputting said heated water to the load, the heated water flowing through the secondary side of the heat exchanger in a first direction;
- an input for receiving mains water; and
- a back-flushing valve for controlling flow of the water to be heated and the mains water;
- wherein, upon consumption of a portion of the water to be heated, the back-flushing valve passively directs mains water through the secondary side of the heat exchanger in a second direction opposite to that travelled by the water to be heated.

26. The module of claim 25, wherein the back-flushing valve provides a bypass flow when said valve is closed.

27. The module of claim 26, wherein the bypass flow is about 1% to about 20% of a flow rate during consumption of the water.

28. A method for passively back flushing a heat exchanger in a thermal energy system, comprising:
- providing a heat exchanger for transferring thermal energy between a source and a load, the heat exchanger having a primary side associated with said source, and a secondary side for conducting a fluid associated with said load;
- providing a source of excess fluid;
- flowing the fluid through the secondary side of the heat exchanger in a first direction; and
- upon consumption of at least a portion of the fluid by the load, passively flowing said excess fluid through the secondary side of the heat exchanger in a second direction opposite to the first direction to back flush said heat exchanger.

29. The method of claim 28, wherein the fluid is water.

30. The method of claim 28, wherein the thermal energy system is a hot water system.

31. The method of claim 28, wherein the thermal energy system is a chilled water system.

32. The method of claim 28, wherein the back-flushing step is activated by at least one of flow rate, temperature, and pressure of the fluid.

33. The method of claim 28, wherein the back-flushing step is activated by flow rate of the fluid.

34. The method of claim 30, wherein the source is a heat source selected from solar heat, waste heat, geothermal heat, industrial process heat, a heat pump, a boiler, and a furnace.

35. The method of claim 30, wherein the source is solar heat.

* * * * *